Jan. 6, 1931.  F. FAVARGER  1,787,620
QUOTATION INDICATING SYSTEM
Filed Jan. 16, 1923  7 Sheets-Sheet 1
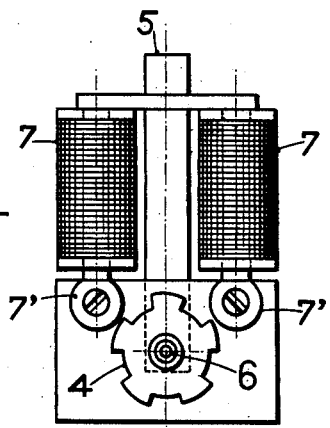
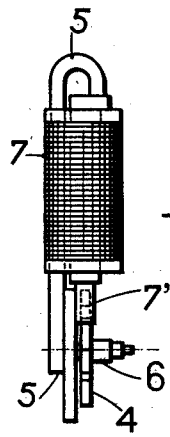
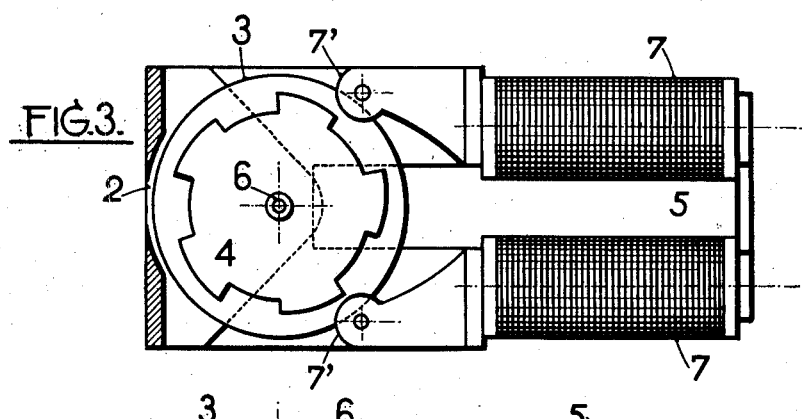
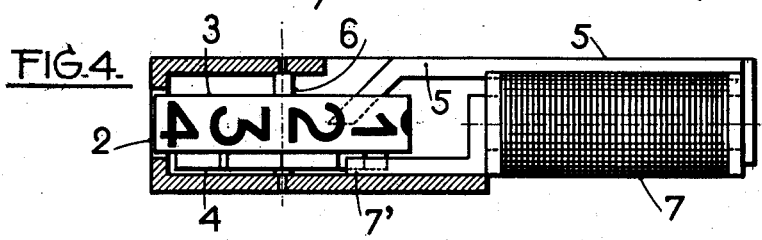
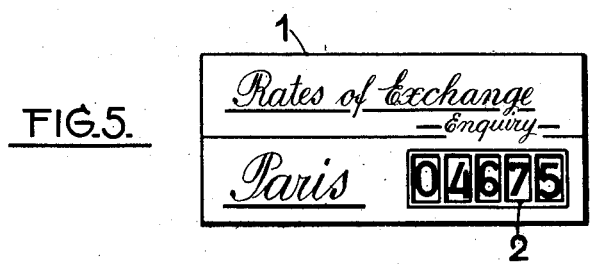
INVENTOR:
François Favarger
BY Wm Wallace White
ATT'Y.

Jan. 6, 1931.  F. FAVARGER  1,787,620
QUOTATION INDICATING SYSTEM
Filed Jan. 16, 1923  7 Sheets-Sheet 2
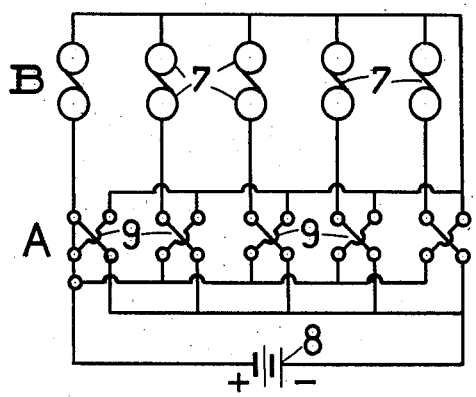
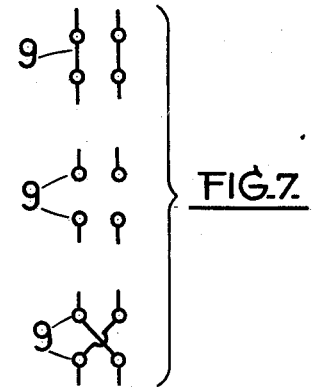

Jan. 6, 1931.  F. FAVARGER  1,787,620
QUOTATION INDICATING SYSTEM
Filed Jan. 16, 1923   7 Sheets-Sheet 3

INVENTOR:
Francois Favarger
BY Wm Wallace White
ATT'Y.

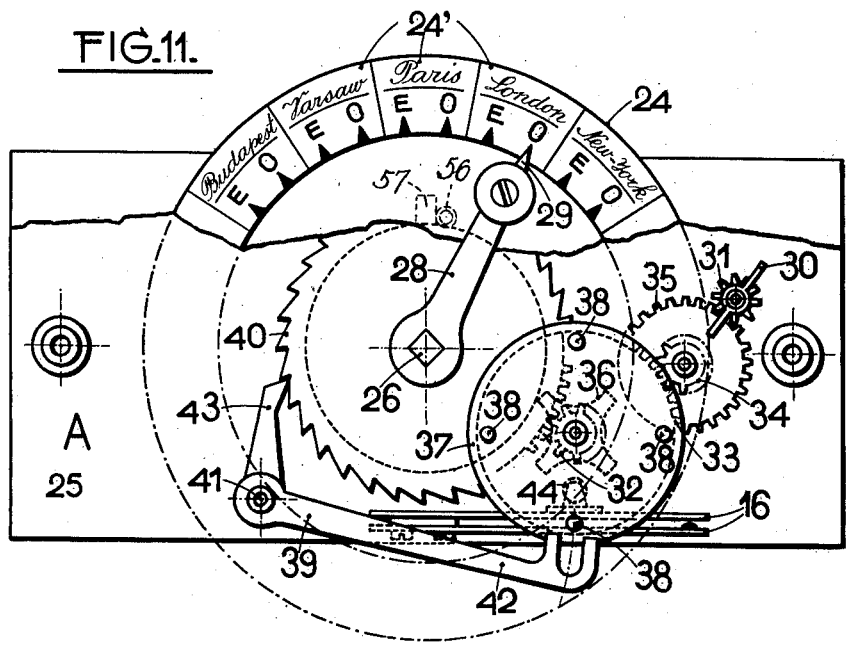
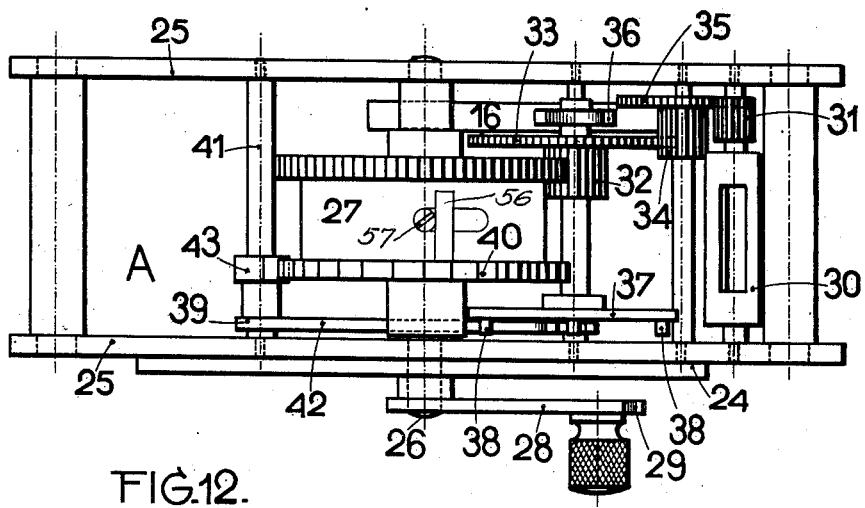

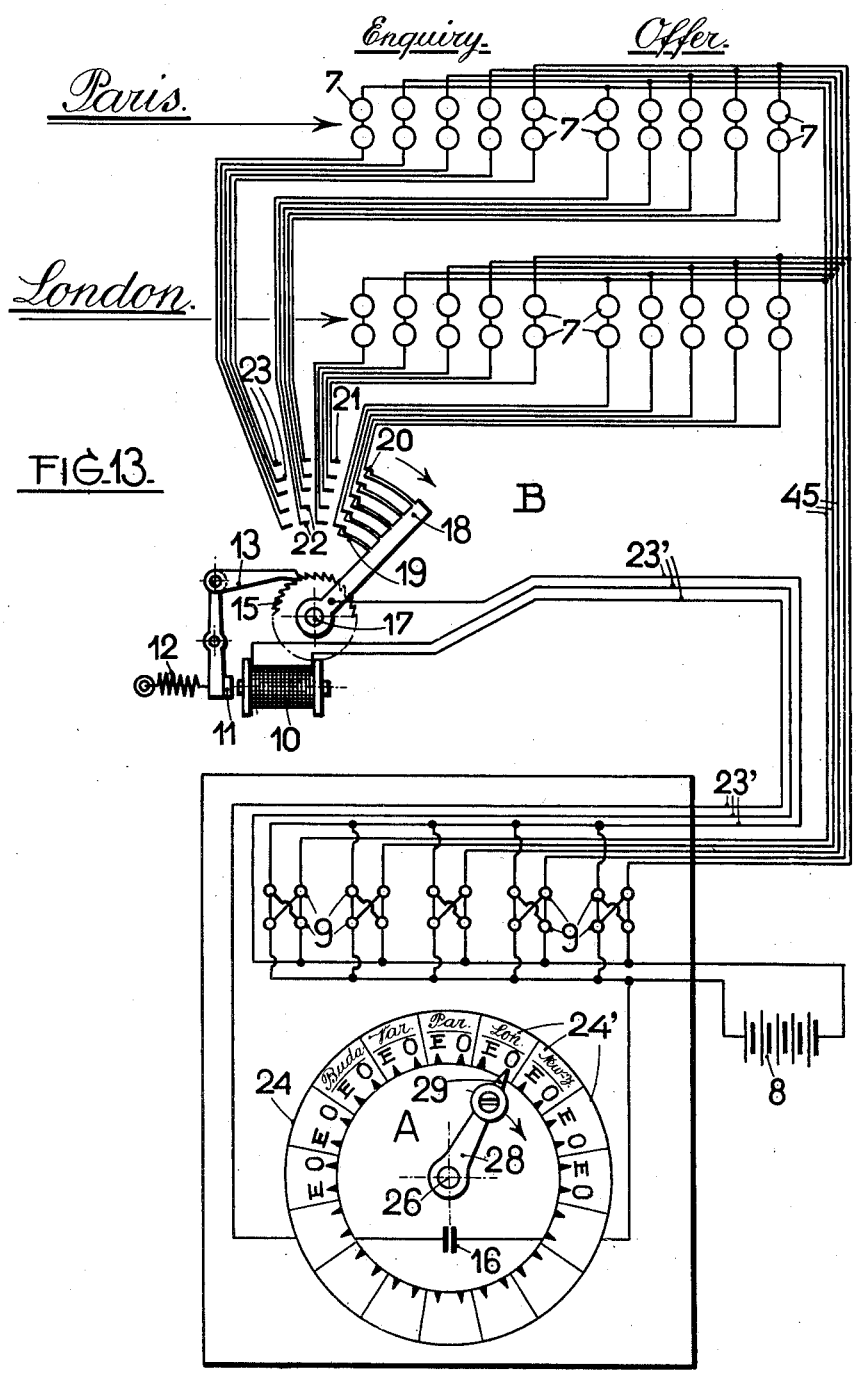

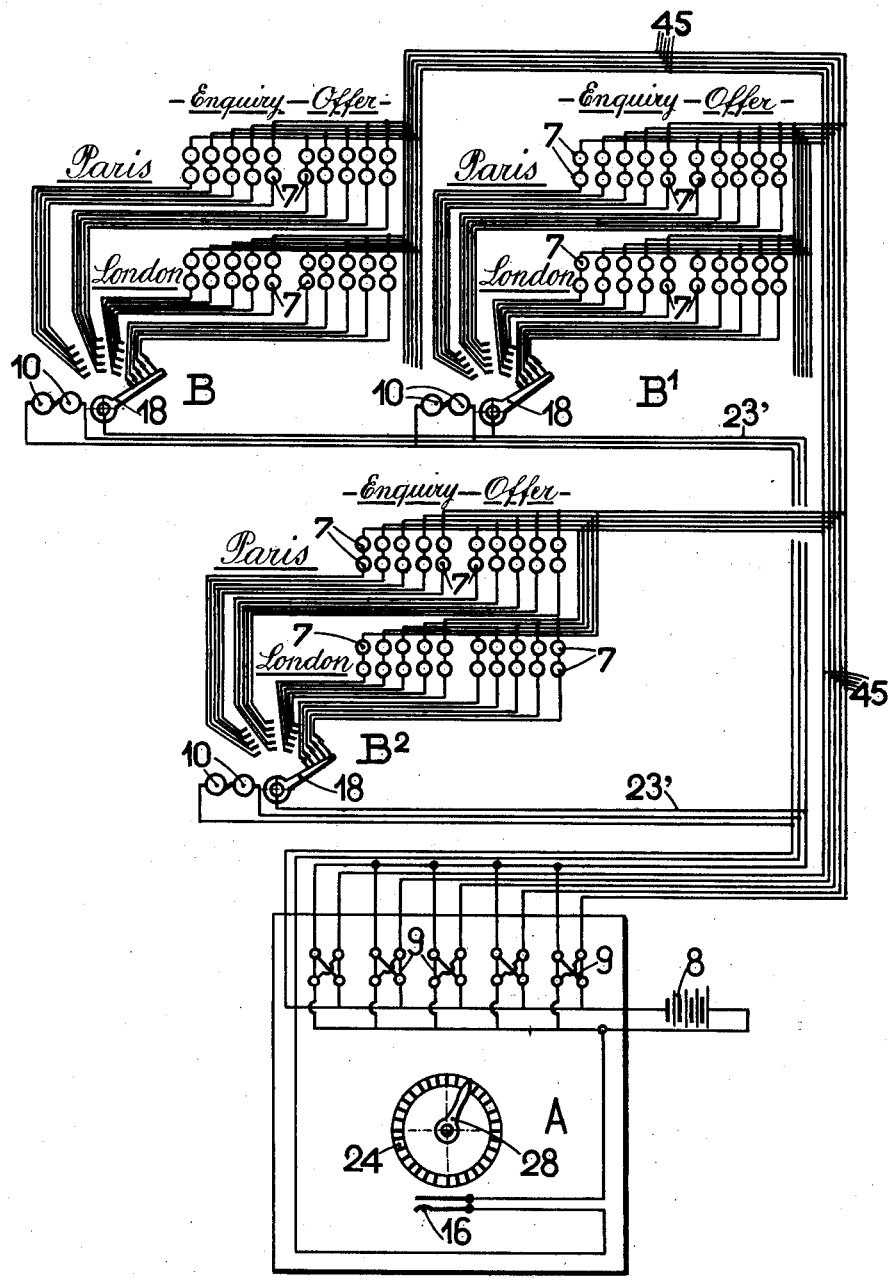

Jan. 6, 1931.  F. FAVARGER  1,787,620
QUOTATION INDICATING SYSTEM
Filed Jan. 16, 1923  7 Sheets-Sheet 7

INVENTOR:
Francois Favarger
By Wm Wallace White
ATTY.

Patented Jan. 6, 1931

1,787,620

UNITED STATES PATENT OFFICE

FRANÇOIS FAVARGER, OF NEUCHATEL, SWITZERLAND, ASSIGNOR, BY MESNE ASSIGNMENTS, TO THE TELEREGISTER CORPORATION, OF NEW YORK, N. Y., A CORPORATION OF DELAWARE

QUOTATION-INDICATING SYSTEM

Application filed January 16, 1923, Serial No. 613,012, and in Switzerland January 19, 1922.

The present invention relates to an electrical apparatus for the remote control of indicating instruments such for example as apparatus for showing stock quotations or the rates of exchange of various countries, the objects of the invention including the provision of apparatus of this character comprising numerous groups of rotating indicating elements electrically associated through the medium of selecting means, with a transmitting apparatus, whereby the operator may at will operate the indicating elements of any one of said groups, from the transmitting device.

The objects of this invention also include the provision of apparatus and equipment of the above indicated class which will be adaptable with a wide degree of flexibility of various operating conditions and which will be dependable, relatively simple and efficient in operation.

Various further and more specific objects, features and advantages will clearly appear from the detailed description given below taken in connection with the accompanying drawings which form a part of this specification and illustrate merely by way of example various embodiments of the invention.

The accompanying drawings illustrate several practical forms by which the object of the invention is attained. In these drawings:—

Figs. 1 and 2 show a front and side elevation, respectively, of an electro-magnet with a toothed and polarized rotary armature. This electro-magnet is built to several designs hereinafter described and is used as the controlling member of the movable indicating elements of the receiving device.

Fig. 3 is an elevation, partly in section, of a receiving device with one movable indicating element only, controlled by an electromagnet with a rotary armature.

Fig. 4 is a plan view, partly in section, of this receiving device.

Fig. 5 is a front elevation of a receiving device comprising a single set of 5 indicating elements such as are shown in Figs. 3 and 4.

Fig. 6 is a diagram of the electrical connections for the control of the receiving instruments shown in Fig. 5.

Fig. 7 is a schematic drawing of the various positions of the handle controlling the current-reversing switches shown in Fig. 6.

Fig. 8 represents the panel of the receiving device of a complete installation.

Fig. 11 shows a front elevation of the transmitting device corresponding to the design illustrated in Figs. 8, 9 and 10.

Fig. 12 is a plan view of the same transmitting device.

Fig. 13 is a schematic drawing of the complete installation of which certain details are shown in Figs. 8 to 12; this figure shows, however, 4 sets of movable indicating elements only instead of 32 as arranged for on the board shown in Fig. 8.

Fig. 14 is a schematic drawing of an alternative layout to the complete preceding installation, this alternative being drawn to a smaller scale and showing three indicating boards controlled simultaneously by a transmitting device.

Figure 9:
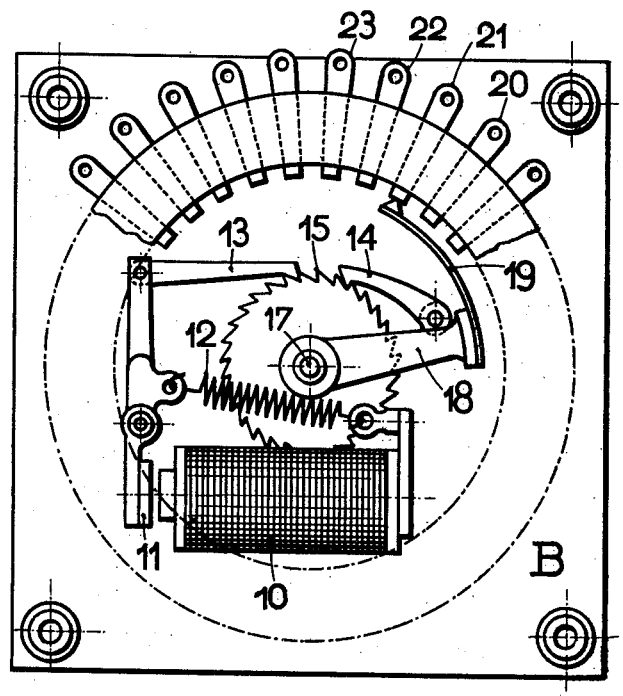
Fig. 9 is a partial elevation of the selector corresponding to the design shown in Fig. 8.

The various arrangements here illustrated in the drawings by way of example only, of the present invention, are intended to inform, by means of numbers, that part of the public who are interested, of the variable rates of exchange of one or several countries, the exchange of the country where the installation is used being taken as a basis. A simple form of a complete installation is that shown in Figs. 3 to 7. This design comprises two separate devices, namely, a transmitting device A and a receiving device B, Fig. 6.

The latter comprises an indicating table with an aperture 2 in which the decimal number composed of five figures "04675" appears, which number for example may give the rate of exchange for Paris. This decimal number of five figures is composed of five indicating movable elements, masked by the board 1, each one of which consists of a rotary drum 3 on the periphery of which are marked the ten figures from 0 to 9 regularly spaced one from another, as is shown in Figs. 3 and 4. The five drums mentioned are placed coaxially opposite the aperture 2 so that the aperture masks all but one figure on each drum. The five drums thus form together any number of five figures according to the angular position of each of the drums 3. Each drum 3 is controlled by an electro-magnet with a rotatable polarized and toothed armature. This electro-magnet is shown in Figs. 1 and 2 and is composed of an armature 4 comprising a soft iron disc polarized south or north by a fixed magnet 5 and carrying on its periphery five teeth, the outside curvature of which is slightly eccentric with regard to the center of the disc. This armature, mounted on a pivoted axle 6 between the two poles 7' of a horse-shoe electro-magnet 7, through the coil of which alternately reversed current can be caused to flow, rotates step-by-step, but always in the same direction, under the influence of the current impulses received. The angular displacement of the rotary armature corresponding to each impulse is equal to half a pitch, each pitch comprising one tooth and one space. As the armature comprises five teeth regularly spaced on the periphery and all identical, ten emissions of alternating current sent through the electro-magnet 7 are required to cause one revolution of the armature 4.

Each of the drums designated by number 3 is secured on the shaft 6 of the rotary armature 4, as described above and in the manner shown in Figs. 3 and 4. The coils of each electro-magnet are connected on the one hand to a source 8 of electric current and, on the other hand, to a current reversing switch 9 of the transmitting device A, as is shown in Fig. 6. For each of the five electro-magnets 7 there is, therefore, one current reversing switch 9, which comprises a handle which the operator can place in three different positions indicated schematically in Fig. 7. When the handle is placed in the upper position, the source 8 of electric current is connected to the electro-magnet 7, corresponding to the handle in question, in such a manner that the current which flows through the coil has a given direction which we will name positive. The armature of the electro-magnet revolves through one-tenth of a revolution or remains stationary according to the relative position of the electro-magnetic couple. If the handle be placed in the intermediate position, no current flows. Lastly, if the handle be placed in the lower position, Fig. 7, the source 8 of electric current causes a current to flow through the coil of the electro-magnet in the contrary direction, which we will name negative, so that the armature 4 revolves through one-tenth of a revolution or remains stationary for the same reason as given above for the case in which the handle was placed in the upper position. The electro-magnetic couple is arranged so that, for example, a positive flow of current causes an even number to appear in the aperture 2, Figs. 3 and 4, while a negative emission causes an uneven number to appear in the aperture.

If therefore the operator brings the handle 9, the second from the left in Fig. 6, four times in succession from the lower to the upper position without stopping at the intermediary position, he causes the armature 4 of the electro-magnet 7, second on the left, to revolve through four-tenths of a revolution and, therefore, also the corresponding drum 3 in such a way, that if this drum showed the number 4 at the aperture 2 before the operation was carried out, it would show the number 8 after the operation. The operator can, therefore, cause the number giving the Paris rate of exchange to be placed opposite the aperture 2 of the receiving device B, placed at a distance.

In practice, however, the problem to be solved is much more complicated than the one which has been explained. Business men are not interested in the rate of exchange of one country alone but in those of all the countries with which they do business. Further, it does not suffice that they should be informed of the rate at which they can purchase money, either in gold or in notes etc., of any one country; they must also be informed of the rate at which they can sell it.

The designs shown in Figs. 6 to 13 fulfill the desired conditions. The indicating panel of the receiving device is shown in Fig. 8. It comprises two vertically disposed rows of apertures 2, one row being headed "Enquiry" and the other "Offer". Each vertical row comprises sixteen apertures corresponding to sixteen countries of which it is desired to make known the fluctuating rate of exchange. The names of the capitals of these sixteen countries are printed opposite the respective apertures. The receiving device thus consists of 32 sets of mobile indicating elements, identical to those shown in Fig. 5. There are, therefore, $32 \times 5 = 160$ electro-magnets with rotary armatures. Thus, if, in principle, the diagram of connections shown on Fig. 6 were adhered to, it would be necessary to mount 160 reversing-current switches with handles on the transmitting device and the number of connecting wires between the transmitting and receiving devices would be 160+1, the last wire being the return wire common to all the electro-magnets of the drums bearing numbers. It is easy to understand that the operation of the 160 handles would give rise to frequent mistakes on the part of the operator, and, further, that the large number of wires to be laid between the transmitting and the receiving device would make the plant expensive in all cases where the transmitting station is placed at a relatively long distance from the receiving station and in cases where several receiving stations are connected up, either in parallel or in series, to the same transmitting station.

The diagram of connections shown in Fig. 13 shows how the problem was solved in the case of an indicating panel designed with reference to Fig. 8. The number of wires connecting the transmitting device A to the receiving device B is reduced to 5+1+2=8 in all. It will also be noted that the number of reversing-current switches with handles 9 of the transmitting device is only five, that is to say, the same as the number of movable indicating elements belonging to a set corresponding to one aperture 2 of the receiving device. To attain this double result, it was necessary to add to the receiving device a supplementary receiving mechanism, which will be known in the present description as the "selector", and also to complete the transmitting device by adding thereto a transmitting mechanism which controls the selector at a distance.

Figure 10:
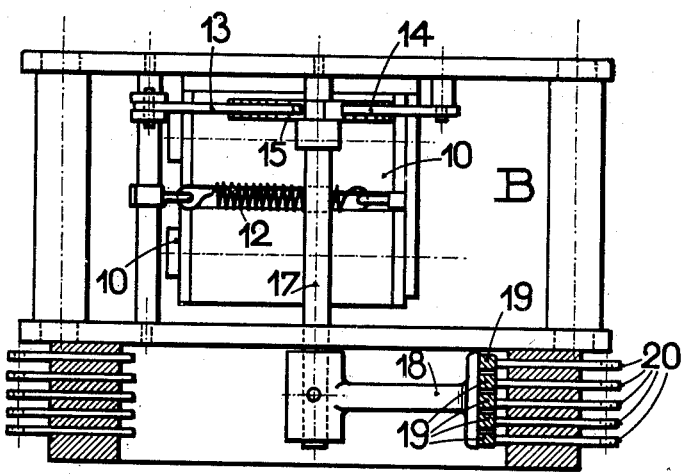
Fig. 10 is a plan view, partly in section, of the selector shown in Fig. 9.

The selector is shown in Figs. 9, 10 and 13. It comprises an unpolarized electro-magnet 10, the flat armature 11 of which, with the help of its counterspring 12, works a ratchet wheel 15 through an impulse pawl 13 and a safety pawl 14, in the usual manner. This wheel revolves by one pitch for each double oscillation of the armature 11. The wheel 15 has thirty-two teeth, that is to say, twice as many teeth as there are capitals of countries given on the indicating panel, Fig. 8. Current from the source 8 flows through the coil of the electro-magnet 10 of the selector and always in the same direction, whenever a switch 16 is closed by the supplementary transmitting device or mechanism mentioned before. On the axle 17 of the ratchet wheel 15 is fastened a balancing arm 18 on the end of which are secured five spring contacts 19, which are not insulated from the metallic mass of the selector and which put the insulated metallic blades 20, 21, 22 and 23 (Figs. 9, 10 and 13) in contact with the mass one after the other, as the ratchet wheel 15 and its arm 18 revolve under the influence of the currents sent out by the switch 16 of the electro-magnet 10. The arm 18, that is to say, the metallic mass of the selector is connected by a wire 23' to the common wire coming out of the reversing-current switches 9 of the transmitting device A. On the other hand, the insulated metallic blades 23 are connected to the five wires feeding the electro-magnets with polarized armatures of the set "Paris and enquiry", and the five insulated metallic blades 22 are connected to the five wires feeding the electro-magnets with polarized armatures of the set "Paris and offer".

Thus the two sets of electro-magnets 7 of each town given on the indicating table shown in Fig. 8 are connected to two corresponding sets of insulated metallic blades. The thirty-two sets of each five blades corresponding to the sixteen towns on the indicating panel of Fig. 8 are placed concentrically all round the axle 17 of the ratchet wheel 15, as is shown in Figs. 9 and 10 and schematically in Fig. 13.

In this last figure, only the set of blades and sets of electro-magnets which correspond on the indicating panel to the towns of Paris and London are shown. The thirty-two sets of insulated blades placed round the axle 17 in the same order as that in which the names of the corresponding towns and the indications "Enquiry" and "Offer" (E and O) are placed on dial 24 (Figs. 11, 12 and 13) of the supplementary mechanism of the transmitting device which will now be described.

A circular dial 24, like a rim, is fastened to the front of a frame 25. This dial is subdivided into sixteen segments 24', each bearing the name of one of the towns given on the indicating panel of Fig. 8, as well as two marks "E" and "O" meaning respectively "Enquiry" and "Offer". As said before, each set of five insulated blades on the selector corresponds to one of the thirty-two marks on the dial 24. In the center of the dial is the end of a shaft 26 of a spring barrel 27 belonging to a clockwork mechanism. A handle 28 is attached to the said end of the shaft 26, the extremity of which handle is provided with a pointer 29, placed in front of the marks on the dial 24. By means of a knob mounted on the handle the operator can swing the latter round, always in the same direction, so as to bring the pointer opposite any one of the thirty-two marks on the dial. Apart from the aforesaid spring barrel, the clockwork comprises a regulating fly-wheel 30, the pinion 31 of which is driven by the toothed drum of the spring barrel 27 through a series of pinions and toothed wheels 32, 33, 34, 35 when the operator turns the handle 28, thereby causing the shaft of the spring barrel to rotate. On the ends of the common axle of the wheels 32 and 33 are secured, respectively, a cam 36 with four arms, and a disc 37 provided with four lateral pins 38 which, along with an oscillating anchor 39 and a ratchet wheel 40 fastened on the shaft 26 of the spring barrel, form a safety escapement. To obtain this object, the anchor 39 is mounted on an axle 41 and is made with two arms. One arm 42, the end of which forms a fork, is adapted to engage with the aforesaid pins 38 of the disc 37; the end of the other arm 43 is shaped to fit between the teeth of the ratchet wheel 40. This wheel 40 has thirty-two teeth, that is to say the same number as the ratchet wheel 15 of the selector and as there are marks on the dial 24. When the clockwork is working, the arms of the cam 36 strike in turn against a roller 44 mounted on one of the contact blades which form the spring of the switch 16 (Figs. 11, 12, 13) mentioned before. This switch 16 is, therefore, closed and opened alternately by the cam and at each closing of this switch current flows through the electro-magnet 10 of the selector B and causes the ratchet wheel 15 and the arm 18 with its spring 19 to revolve through 1/32nd of a circle, through the action of the impulse pawl 13 of the armature.

When the operator turns the handle 28, the spring of the spring barrel is wound up and the ratchet wheel 40 moves through an angle equal to that swept by the handle 28, that is to say, if the latter be displaced, for example, four divisions or marks on the dial 24, the ratchet wheel 40 moves through an equivalent angle corresponding to four of its teeth. During this time the arm 43 functions as a detent and prevents the handle 28 from returning to initial position under the action of the spring motor. The arm 28 being turned, the teeth of the ratchet wheel throw out the arm 43 and rock the anchor 39 in such wise that the bifurcated end of the arm 42 engages one of the pins 38 to prevent the movable members of the clockwork from movement during the shift of the handle 28. But when the operator releases the handle 28, the detent 43 engages the ratchet wheel 40 so that the anchor rocks in the opposite direction and releases the pin 38. The clockwork now operates, and, acting through the cam 36, actuates the roller 44 and thus the switch 16. The duration of movement of the clockwork being a function of the angular displacement of the handle 28, the switch 16 is closed and opened four times successively in the present example, and thus causes the ratchet wheel 15 of the selector to revolve through an arc corresponding to four teeth of this wheel. In other words, it being understood that the ratio of the gearing between the drum 27 and the disk 37 is such that for each movement of the drum through an angular distance corresponding to the length of one tooth of the ratchet, the disk 37 is rotated exactly one-quarter of a revolution, so that if the handle has been moved so as to rotate the shaft through a distance equal to four ratchet teeth while the disk is held against rotation by engagement of the forked end of arm 42 with one of the pins 38, the spring is wound to such an extent as to impart to the drum 27, when the shaft is held against rotation, a movement exactly corresponding to the winding movement of the shaft, and at the end of such movement, which is terminated by engagement of any suitable stop means such as pins as at 56 and 57, the disk will stop with one of the pins 38 directly over the forked portion of arm 42. It should also be understood that during the turning of the shaft in clockwise direction by means of the handle 28, the detent or pawl 43 rides only on the highest portions of the ratchet teeth, so that during this movement the forked end of arm 42 does not have an opportunity to release the pin 38 of the disk. When the handle 28 comes to rest however and is released by the operator, the shaft, under the influence of the spring, has a slight movement in anti-clockwise direction, thereby permitting the detent to engage the deepest part of the ratchet tooth as shown in Fig. 11, and then only can the pins 38 of the disk 37 pass freely out of engagement with the fork of arm 42. Now as the arm 18 and the spring contacts 19 are rigidly secured to the ratchet wheel 15, the aforesaid spring contacts are brought into contact with the set of insulated blades corresponding to the set indicated by the pointer 29 of the handle of the dial 24, for example: "London-offer". Each set of five insulated blades of the selector is connected by five wires to the corresponding set of electro-magnets 7 with polarized armatures (Fig. 13) and these sets of electro-magnets are connected by wires to the five line wires 45, which are themselves connected to the reversing-current switches 9 and to the source 8 of current respectively. These switches 9 are all connected to the mass of the selector through the common wire 23'. The circuit of the electro-magnet 10 of the selector is also fed by the current source 8 and contains the switch 16.

The circuit of any one set of electro-magnets with polarized armatures of the receiving device is, therefore, closed mechanically, and automatically through the action of the clockwork and not by the hand of the operator on handle 28. This arrangement insures that the functions of the automatic switch 16 be carried out regularly and in correct succession as well as the proper working of the various moving parts of the selector. When, once, the circuit of a given set of electro-magnets 7 has been closed through the action of the operator on the handle 28, he is in a position to change at will the number showing in the corresponding aperture of the indicating panel, by operating one or several or all the handles of the reversing-current switches 9, thus sending currents in alternating directions through the electro-magnets of the set in question. The control of the installation is, thus, reduced to two very simple operations:

1. The bringing of the handle 28 opposite the mark "Enquiry" or "Offer" of whichever of the segments of the dial gives the name of the town in question.

2. The manipulation of one or more of the five handles belonging to the reversing-current switch corresponding to the number to be changed.

The practical design shown as an example comprises only one receiving device with its indicating panel. It is, however, possible to control two or more receiving devices, each with its indicating panel and placed in different places by means of the transmitting device described.

A practical lay-out of this kind is shown schematically in Fig. 14. It comprises a transmitting device A connected to three receiving devices B, B¹, B², identical to one another and each having an indicating panel and a selector.

The reference characters in Fig. 14 correspond to those in Fig. 13 and designate similar parts. It is superfluous to describe how the wiring is connected, since a description thereof is given in detail of the lay-out shown schematically in Fig. 13, which is the same in principle, as can be clearly seen from the drawing.

Figure 15:
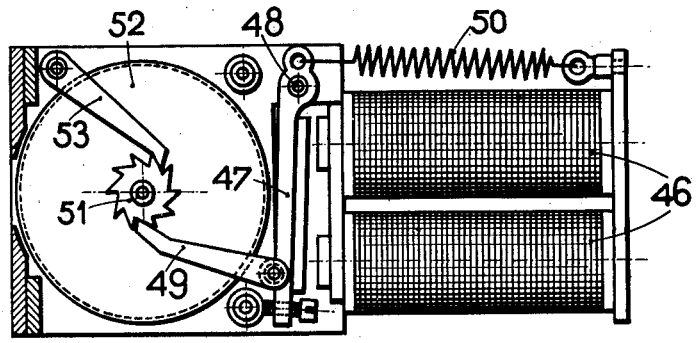
Fig. 15 is a front elevation, partly in section, of an alternative design of the control mechanism of the movable indicating elements belonging to the receiving device. Here the electro-magnet with the special armature shown is replaced by an ordinary electro-magnet.
Figure 16:
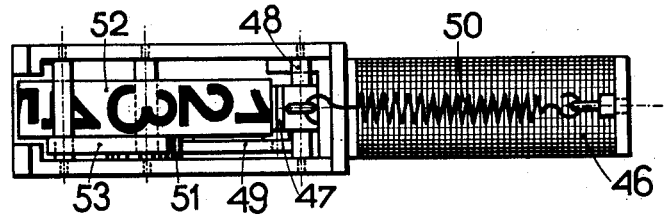
Fig. 16 is a plan view of the control mechanism shown in Fig. 15.
Figure 17:
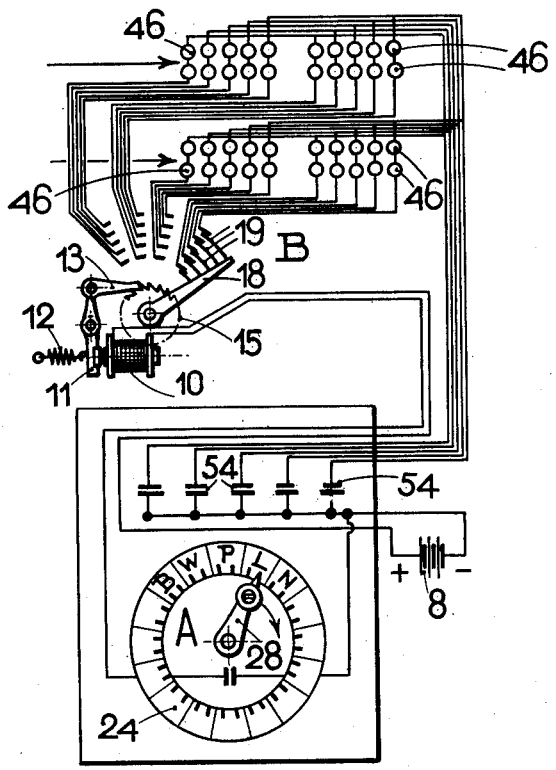
Fig. 17 is a schematic drawing of a complete installation in which the control mechanism shown in Figs. 15 and 16 can be used.

Figs. 15, 16 and 17 show another practical design of an installation carried out according to the object of the invention. This design is only an alternative to that of which the diagram of connections is shown in Fig. 13. As in the latter, there are a transmitting device A and a receiving device B provided with a selector and an indicating panel identical to the one shown in Fig. 8. The source 8 of electric current, the dial 24 and the handle 28 of the supplementary transmitting mechanism which permits control of the selector comprising the electro-magnet 10, the impulsion pawl 13, the ratchet wheel 15, the armature 11, the arm 18 with its five spring contacts 19 which work together with the 32 sets of insulated blades connected respectively to the 32 sets of electro-magnets 46 which control in their turn the drums bearing the numbers, are again shown.

The characteristic feature of this alternative practical design resides in the fact that the electro-magnets 46 are of another type than that shown in Figs. 1 to 4. The latter comprise a rotary toothed and polarized armature and are controlled by an alternately reversed flow of current through their coils, while the electro-magnet 46 is designed for current flowing always in the same sense. Figs. 15 and 16 show an electro-magnet of this kind together with the drum bearing the numbers which it controls. The flat armature 47 pivots at 48 and is provided with an impulsion pawl 49 with a recoil spring 50. After each movement of the armature 47 against the pull of the said recoil spring 50 and towards the poles of the electro-magnet 46, to which it is attracted when current flows through the coils of the electro-magnet, the impulse pawl acts on a ratchet wheel 51 having ten teeth, which is fastened on the shaft of the drum 52 and makes the wheel rotate and with it the drum through one-tenth of a revolution. The safety pawl is marked by 53. The spring 50 could be replaced by a counterweight.

As the receiving device B is provided with electro-magnets of the type which has just been described, that is to say for current flowing always in the same direction, the transmitting device A comprises ordinary contact buttons 54, Fig. 17, instead of reversing-current switches 9 as shown in the diagrams of connections of Figs. 6, 7, 13 and 14.

In the practical designs described, each set of indicating elements of the indicating panel is composed of five units because a number with five figures is sufficient for all practical purposes for indicating the fluctuations of rates of exchange. But it is obvious that in each installation, whatever its purpose may be, the number of sets of indicating elements as well as the number of elements in a set may differ from those of the examples given. The mobile indicating elements can be made to bear figures representing fractions or any other conventional signs.

Various features of the indicator units and indicator board described herein are claimed in my copending application, Ser. No. 239,349, filed December 12, 1927, which comprises a continuation in part of this application.

While the invention has been described in detail with respect to particular preferred examples thereof which give satisfactory results, it will be understood by those skilled in the art after understanding the invention, that various changes and modifications may be made without departing from the spirit and scope of the invention and it is intended therefore in the appended claim to cover such changes and modifications.

Having now fully described my said invention what I claim as new and desire to secure by Letters Patent is:—

Apparatus for transmitting varying quotations as of exchange, stocks, or other items from a central point and indicating and posting the same at a plurality of stations, comprising at each station a large number of groups of electromagnetic impulse operated step-by-step indicators, each group comprising one indicator for each of several digits of each quotation to be posted, line impulse channels common to all the stations and running to the central point, all said indicators which correspond to the same decimal place of the quotations posted being operable over the same one of said channels, one of said channels thus being provided for each decimal place, impulse operated selector means at each station common to a plurality of said groups and electrical connections to operate said means from the central point by various groups of impulses for bringing the digit indicators of a particular desired item into concurrent operative relationship with their corresponding impulse channels, and means at the central point acting through the indicator operating channels respectively for independently actuating each of the digit indicators thus selected and for effecting such actuation of said several selected digit indicators substantially concurrently if desired.

In testimony whereof I have signed my name to this specification.

FRANÇOIS FAVARGER.